United States Statutory Invention Registration [19]

[11] Reg. Number: H326

Brager et al. [43] Published: Sep. 1, 1987

[54] Mn-Fe BASE AND Mn-Cr-Fe BASE AUSTENITIC ALLOYS

[75] Inventors: Howard R. Brager; Francis A. Garner, both of Richland, Wash.

[73] Assignee: The United States of America as represented by the United States Department of Energy, Washington, D.C.

[21] Appl. No.: 878,501

[22] Filed: Jun. 23, 1986

Related U.S. Application Data

[63] Continuation of Ser. No. 612,771, May 22, 1984.

[51] Int. Cl.[4] ..... C22C 38/04; C22C 38/06; C22C 38/38; G21B 1/00

[52] U.S. Cl. ..... 420/63; 420/34; 420/42; 420/56; 420/62; 420/64; 420/65; 420/72; 420/74; 420/87; 420/103; 420/104; 420/112; 420/113; 420/114; 420/583; 420/584; 420/588; 148/325; 148/327; 376/136; 376/900

[58] Field of Search ..... 376/900; 420/42, 56, 420/72, 74, 87, 104, 583, 588; 148/325, 327, 333, 337

[56] References Cited

U.S. PATENT DOCUMENTS 3,904,401 9/1975 Mertz et al. ..... 148/38

FOREIGN PATENT DOCUMENTS 2241231 3/1973 Fed. Rep. of Germany .... 75/126 B
57-200543 12/1982 Japan ..... 420/74
58-224151 12/1983 Japan ..... 420/74
59-28561 2/1984 Japan ..... 420/583

OTHER PUBLICATIONS

Key to Steels, 10 edition 1974, West Germany.

*Primary Examiner*—Richard D. Lovering
*Assistant Examiner*—Eric Jorgensen
*Attorney, Agent, or Firm*—Robert Southworth, III; Judson R. Hightower

[57] ABSTRACT

Manganese-iron base and manganese-chromium-iron base austenitic alloys designed to have resistance to neutron irradiation induced swelling and low activation have the following compositions (in weight percent): 20 to 40 Mn; up to about 15 Cr; about 0.4 to about 3.0 Si; an austenite stabilizing element selected from C and N, alone or in combination with each other, and in an amount effective to substantially stabilize the austenite phase, but less than about 0.7 C, and less than about 0.3 N; up to about 2.5 V; up to about 0.1 P; up to about 0.01 B; up to about 3.0 Al; up to about 0.5 Ni; up to about 2.0 W; up to about 1.0 Ti; up to about 1.0 Ta; and with the remainder of the alloy being essentially iron.

46 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Mn-Fe BASE AND Mn-Cr-Fe BASE AUSTENITIC ALLOYS

GOVERNMENT CONTRACT

The invention described herein was made during the course of, or in the performance of work, under U.S. Government Contract No. DE-AC06-76FF02170 under the auspices of the Department of Energy.

This application is a continuation, of application Ser. No. 06/612,771, filed May 22, 1984.

BACKGROUND OF THE INVENTION

The present invention pertains to manganese-iron base and manganese-chromium-iron base austenitic alloys. It is especially concerned with those alloys having resistance to neutron irradiation induced swelling and low post irradiation residual radioactivity (i.e. low activation).

Over the years, a number of austenitic, nickel-chromium-iron base, alloys and ferritic, chromium-iron base, alloys have been studied and developed for use in the high temperature, high energy neutron (0.1 MeV to 1.0 MeV) environment encountered in a liquid metal fast breeder reactor (LMFBR)—a fission reactor. One of the prime objectives of the LMFBR alloy development program has been to develop alloys, which are swelling resistant and have the required irradiation mechanical properties for use as fuel cladding and/or use as ducts. The fuel cladding will see service in contact with flowing liquid sodium and have a surface temperature of about 400° C. ($\approx$750° F.) to 650° C. ($\approx$1200° F.). A duct surrounds each bundle of fuel pins and sees service at about 380° C. ($\approx$715° F.) to 550° C. ($\approx$1020° F.). These components will be exposed at the aforementioned elevated temperatures to neutron fluxes on the order of $10^{15}$ n/cm$^2$.s (E>0.1 MeV), and should be capable of performing adequately to fluences on the order of 2 to $3\times10^{23}$ n/cm$^2$ (E>0.1 MeV).

The Fe-Ni-Cr austenitic alloys being evaluated include the austenitic stainless steels described in U.S. Pat. Nos. 4,158,606; 4,407,673; and 4,421,572. In addition, Fe-Ni-Cr austenitic superalloys are being evaluated and have included those described in U.S. Pat. Nos. 4,040,876; 4,129,462; 4,172,742; 4,225,364; 4,359,349; 4,359,350; 4,377,553; and U.S. patent application Ser. No. 370,438 filed Apr. 21, 1982.

The foregoing efforts have been aimed at providing materials for the LMFBR environment. The fusion reactor, or CTR (Controlled Thermonuclear Reactor), also requires development of structural materials for use in its neutron irradiation environment. While a large number of, differing, fusion reaction designs have been proposed, a common requirement is the need for a low swelling, low activation material having good irradiation mechanical properties for use as a "first wall" material. The first wall forms a vacuum chamber which will hold the hot (up to $10^8$° K. in its interior) plasma in which the fusion reaction takes place. The plasma side of the first wall may be coated with a protective material such as graphite or silicon carbide. The opposite side of the first wall may be in contact with a fluid medium such as helium, water, liquid lithium or a liquid lithium-lead alloy, for example. Examples of some of the Fusion Reactor designs, and first wall materials being considered, are provided in J. T. Adrian Roberts, "Structural Materials in Nuclear Power Systems" (published in 1981 by Plenum Press New York) at pages 1-12, 279-319, which are hereby incorporated by reference.

As in the LMFBR, the environment in which the fusion reactor first wall material will operate is an elevated temperature neutron irradiation environment. However, this fusion environment will significantly differ from the LMFBR environment in that the energy of the source neutrons from a D-T (deuterium-tritium) fusion reaction is expected to be on the order of about 14 MeV compared to the 0.1 to 1.0 MeV mean neutron energies in the LMFBR fission process. This difference is important in that some of the critical alloying elements in the previously discussed austenitic alloys have (n,p) and (n,$\alpha$) transmutation reactions which are activated by neutrons having energies greater than about 10 MeV, producing radioactive products with long half-lives. This leads to a nuclear waste handling and long term storage problem.

A goal of the fusion reactor first wall alloy development program is to select or develop an alloy which will not only have the needed swelling resistance and mechanical properties, but will also have relatively low residual radioactivity (i.e. "low activation"), allowing relatively short burial times (e.g. 80 to 100 yrs.) prior to reprocessing of the material. To meet this low activation goal, significant restrictions on the amount of the following elements in first wall materials have been proposed: Niobium <3 ppm; Mo <30 ppm; Cu <0.1 wt %; N <0.3 wt %; and Ni <0.9 wt %. The restriction on nickel, and in most cases molybdenum, would eliminate the aforementioned austenitic Ni-Cr-Fe base alloys, developed for the LMFBR, from consideration as first wall materials. Other elements which may require significant restriction are: Ag, Bi, Tb, Ir, Eu and Ba.

Since 1882, when the first austenitic manganese steel was developed by Sir Robert Hadfield, a number of additional austenitic manganese steels have been developed. For the most part, these steels have high toughness, high ductility, a high work hardening coefficient, and good abrasion resistance. Typically, these alloys have been used in commercial applications requiring high toughness and high wear resistance. Some of the nominal commercial compositions, processing, and uses of austenitic manganese steel are listed in: R. B. Ross, "Metallic Materials Specification Handbook", (1980, E. & F. N. Spon Ltd.) at pages 369, 370, 579-582; and ASM (American Society for Metals), "Metals Handbook Ninth Edition, Volume 3—Properties and Selection: Stainless Steels, Tool Materials and Special Purpose Metals" (1980, ASM), at pages 568 to 588. The aforementioned pages from Ross and ASM are hereby incorporated by reference.

BRIEF SUMMARY OF THE INVENTION

We believe that the following alloy compositions will have a combination of good neutron irradiation swelling resistance, and low activation, which will make these alloys suitable for use in neutron irradiation environments, such as those encountered in the LMFBR and the CTR. These alloys contain:

about 20 to about 40 wt. %. Mn;

up to about 15 wt. % Cr;

an austenite stabilizing element selected from C and N, alone or in combination with each other, and in an amount effective to substantially stabilize the austenite phase, but less than about 0.7 wt % C, and less than about 0.3 wt. % N;

silicon in an amount effective to enhance the neutron irradiation swelling resistance of the alloy;

optionally, a strengthening agent selected from about 0.01 to about 0.1 wt. % P, about 0.2 to about 2.5 wt. % V, about 0.2 to about 2.0 wt % W, about 0.1 to about 1.0 wt % Ti, about 0.1 to about 1.0 wt. % Ta, alone or in combination with each other;

optionally, B may be added in amounts effective to enhance high temperature ductility but less than about 0.01 wt. %, and Al may be added in amounts effective to enhance liquid metal corrosion resistance and/or strength, but less than about 3 wt % to avoid increases in activation;

up to about 0.5 wt. % Ni; with the remainder of the alloy being essentially iron.

Preferably the Mn content of the alloy is about 25 to about 40 wt. % and more preferably about 25 to 35 wt. %, with a nominal composition of about 30 wt. % being most preferred.

The chromium content of the alloy is preferably about 2 to about 15 wt. % and more preferably about 5 to about 10 wt. %.

Preferably nitrogen is limited to less than about 0.1 wt. %.

Silicon is preferably present at about 0.4 to about 3.0 wt. % of the alloy, and, more preferably about 0.4 to about 0.8 wt. %.

The phosphorous content of the alloy is preferably about 0.03 to about 0.06 wt. %, and more preferably about 0.03 to about 0.05 wt. %.

The boron content of the alloy is preferably about 0.003 to about 0.006 wt. %.

Preferably the strengthening agent is selected from about 0.03 to about 0.06 wt. % P, about 0.5 to about 1.5 wt. % W, about 0.2 to about 0.5 wt. % Ti, about 0.2 to 0.5 wt. % Ta, alone or in combination with each other.

Preferably the following are considered as incidental impurities, with their concentrations limited to achieve a low activation alloy: Nb, Mo, Cu, N, Ni, Ag, Bi, Tb, Ir, Eu and Ba.

These and other aspects of the present invention will become more apparent upon review of the following, more detailed description of the invention.

DETAILED DESCRIPTION OF THE INVENTION

While not wishing to be bound by theory, we believe that the understanding of, use of, and the advantageous results which may be obtained from the present invention, may be furthered by the following theory:

Upon studying the compositional dependence of high-energy neutron irradiation induced swelling in Fe-Ni-Cr ternary alloys, we have shown that the compositional dependence observed resides primarily in the transient region (i.e. incubation period) of swelling and that the greatest resistance to swelling occurs in the compositional range when nickel content is between about 35 to about 45 wt. % and the chromium content is less than about 15 wt. %. This compositional range is also characterized by anomalous property behavior where many physical properties such as thermal expansion, elastic moduli, lattice parameter and excess free energy exhibit a marked variation with composition. This anomalous behavior is best exemplified by the Invar phenomenon, wherein the thermal coefficient of expansion reaches a minimum near Fe-35 wt. % Ni. At another composition, Fe-7.8 wt % Cr-35 wt. % Ni, the thermoelastic coefficient indeed becomes zero over a significant temperature range. This composition is known as Elinvar and fortuitously corresponds almost exactly with the composition of one of the most swelling-resistant ternary alloys irradiated in the range of 400° to 650° C. This ternary alloy has the composition Fe-7.5 wt. % Cr-35.5 wt. % Ni.

Perhaps it is only coincidental that the Invar, and particularly the Elinvar, composition correspond to the region where the duration of the transient regime of Fe-Ni-Cr austenitic alloys appears to be the longest. However, if one evaluates the current theories of void swelling, it appears that parameters such as lattice parameters and elastic moduli indeed are important determinants of swelling behavior, particularly when radiation-induced segregation occurs at void surfaces. Accordingly, we suggest that a direct connection may exist between the anomalous behavior compositional range and the composition range of maximum swelling resistance.

We have found through review of the available literature that there exists iron-manganese base and iron-chromium-manganese base Invar-like alloys. Therefore, based on the correlation observed in the Fe-Ni and Fe-Cr-Ni systems between Invar-like properties and increased swelling resistance, it is our belief that Fe-Mn and Fe-Cr-Mn alloys having Invar behavior will also have increased swelling resistance. The Invar behavior has been observed in Fe-Mn and Fe-Mn-Cr alloys at similar iron and chromium levels and at levels of Mn comparable to those of Ni in the Fe-Ni and Fe-Ni-Cr Invar type alloys. Based on our review of the available literature we believe that the Invar phenomenon resides at Mn levels on the order of 30 weight percent.

An additional advantage of the Fe-Mn and Fe-Mn-Cr alloys based on the Invar/swelling resistance correlation is a substantial reduction in residual radioactivity after fusion reactor first wall usage compared to the LMFBR Fe-Ni-Cr austenitic alloys.

Therefore in accordance with our invention we believe these alloys should contain 20–40 wt. % Mn, preferably about 25 to about 40 wt. %, and most preferably about 25 to 35 wt. % Mn. Chromium content may vary from zero to up to about 15 wt. %, with the range of about 2 to 15 wt. % being preferred. Most preferably chromium content should be between about 5 to about 10 wt. %. These ranges of Mn and Cr were selected based on the proceeding theory of the invention.

Our alloy also contains silicon in an amount effective to enhance the neutron irradiation swelling resistance of our alloy. We believe that silicon contents of about 0.4 to about 3.0 wt. % should be effective. Silicon contents of about 0.4 to about 0.8 wt. %, however, are preferred.

We further believe it to be desirable that our alloy be substantially austenitic and preferably completely austenitic. To this end, an austenite stabilizer is added. This austenite stabilizing element is selected from C and N, alone or in combination with each other, and in an amount effective to stabilize the austenite phase, but less than about 0.7 wt. % C, and less than about 0.3 wt. % N. The minimum amount of carbon and/or nitrogen needed for a particular alloy may be roughly estimated by referral to a Schaeffler diagram which estimates the microstructural conditions (e.g. amount of austenite, ferrite and martensite) produced by welding as a function of equivalent nickel content and equivalent chromium content. Equivalent nickel content is defined as the wt. % Ni+0.5×wt. % Mn+30×wt. % C+30×wt. % N. Equivalent chromium content is defined as the wt. % Cr+1.5×wt. % Si. While the Schaeffler diagram was developed for Fe-Ni-Cr base austenitic stainless steels, we believe that it can be used to provide a rough estimate of the C+N contents required in the present invention. More accurate assessments may be made through routine experimentation. The Schaeffler Diagram shown in A. L. Schaeffler, "Metal Progress 56," (1949) at page 680B is hereby incorporated by reference.

While both carbon and nitrogen may be added in the amounts described, it is however preferred for low activation alloys that the nitrogen content be less than about 0.1 wt. %.

For high temperature applications such as LMFBR fuel cladding and ducts, and fusion first wall applications, the alloys according to the present invention preferably include a strengthening agent selected to provide enhanced elevated temperature tensile and creep properties. This strengthening agent may be selected from about 0.01 to about 0.1 wt. % P, about 0.2 to about 2.5 wt. % V, about 0.2 to about 2.0 wt. % W, and about 0.1 to about 1.0 wt. % Ti, and about 0.1 to about 1.0 wt. % Ta, alone or in combination with each other. It is believed that phosphorous will not only strengthen the alloy through phosphide precipitation, but will also act to enhance swelling resistance. However, excessive amounts of phosphorous may be deleterious from a weldability standpoint. For these reasons it is preferred that the phosphorous content be held to about 0.03 to about 0.06 wt. %, and more preferably about 0.03 to about 0.05 wt. %.

Tungsten is believed to strengthen the alloy through a solid solution strengthen mechanism and metal carbide precipitation. When present, this element should be preferably held between about 0.5 and about 1.5 wt. % to assure the fabricability of the alloy by conventional metal working techniques.

Titanium and tantalum are very strong formers of carbide precipitates and may be used in that function here to improve ductility and creep properties as well as strength. Titanium and tantalum are preferably held to about 0.2 to about 0.5 wt. %.

Vanadium's preference during irradiation is being evaluated since it forms massive V(C,N) particles during thermal aging, rather than the dispersion of fine precipitates desired for good mechanical properties.

Also in accordance with the present invention boron may be present in the alloy at levels up to about 0.01 wt. % to improve ductility. It is preferred that boron be added in conjunction with the preferred range of phosphorous (0.03 to 0.06 wt. %) to improve creep and stress rupture properties. The preferred boron range to accomplish these goals is about 0.003 to about 0.006 wt. %.

Aluminum may be added to the present alloys to provide improved corrosion resistance, and may be particularly necessary for applications involving contact with liquid metals, such as, lithium and lithium-lead alloys. When added, aluminum should be limited to levels below about 3 wt. % to minimize handling and storage problems due to residual radioactivity. For this reason, it is preferred that the aluminum content of our alloys be about 0.5 to about 2.0 wt. % where enhanced liquid metal corrosion resistance is required.

Nickel may be deliberately added at levels up to about 0.5 wt. %, to provide enhanced austenite stability and improved ductility. Levels above about 0.5 wt. %, should be avoided in order to minimize handling and storage problems due to residual radioactivity. Most preferably nickel is not intentionally added, but is present only as an incidental impurity.

Iron forms essentially the balance of these alloys. In applications having the potential of producing significant amounts of residual radioactivity, the following elements preferably, should at most be present at incidental impurity levels: Nb, Mo, Cu, N, Ni, Ag, Bi, Tb, Ir, Eu, and Ba. The tolerable levels will depend on the specific environment of use, the particular alloy composition, as well as the relevant regulations specifying the maximum level of radioactivity permitted for safe handling after a predetermined burial period.

The invention will be further clarified by consideration of the following detailed examples, which are intended to be purely exemplary of the present invention.

Alloys having the nominal melt composition aiming points shown in Table I were arc melted in a purified argon atmosphere with a non-consumable tungsten electrode. The starting materials used were basically electrolytic, high purity, virgin materials. Buttons of about 175 grams and about ¼"×1"×3" in size, were melted in water cooled copper molds. It is contemplated, that in the future the foregoing starting materials and melting technique may be replaced by higher purity starting materials, such as zone refined materials, and melting techniques allowing better control of incidental impurities.

TABLE I

| | NOMINAL ALLOY COMPOSITIONS (wt. %)* | | | | | | | | | | | | |
|---|---|---|---|---|---|---|---|---|---|---|---|---|---|
| Alloy | Mn | Cr | C | N | V | P | B | Al | W | Ni | Si | Ti | Ta |
| X75 | 30 | 2 | 0.1 | 0.15 | — | — | — | — | — | 0.5 | 0.4 | — | — |
| R76 | 30 | 2 | 0.6 | 0.15 | — | 0.05 | 0.005 | — | — | 0.5 | 0.4 | — | — |
| R77 | 30 | 2 | 0.4 | 0.15 | 1 | 0.05 | 0.005 | — | 1 | 0.5 | 0.4 | — | — |
| R78 | 30 | 5 | 0.05 | 0.15 | — | — | — | — | — | 0.5 | 0.4 | — | — |
| R79 | 30 | 10 | 0.05 | 0.1 | — | — | — | — | — | 0.5 | 0.4 | — | — |
| R80 | 30 | 10 | 0.5 | 0.1 | 2 | — | 0.005 | 1 | 2 | 0.5 | 0.4 | — | — |
| R81 | 20 | 15 | 0.05 | 0.1 | — | — | — | — | — | 0.5 | 0.4 | — | — |
| R129 | 30 | 5 | 0.5 | 0.1 | — | 0.05 | 0.005 | 1 | — | — | 0.4 | — | — |
| R130 | 30 | 5 | 0.5 | 0.1 | — | 0.05 | 0.005 | 1 | — | — | 0.4 | 0.2 | — |
| R132 | 30 | 5 | 0.5 | 0.1 | — | 0.05 | 0.005 | 1 | 1 | — | 0.4 | — | — |
| R133 | 30 | 5 | 0.5 | — | — | 0.05 | 0.005 | — | — | — | 0.8 | — | — |
| R134 | 30 | 5 | 0.5 | 0.1 | — | 0.05 | 0.005 | 1 | — | — | 0.4 | — | 0.2 |

*Balance essentially iron.

All alloys in Table I were then given a homogenization heat treatment in an inert gas for about two hours at about 1250° C. These alloys were then reheated in an inert gas to about 1000° C. and immediately thereafter given about a 50% reduction in thickness by rolling, followed by solution annealing in an inert gas at about 1030° C. for about ½ hour. Subsequently, these alloys were cold rolled for 3 to 4 additional reductions in thickness of about 40 to about 60 percent each, separated by intermediate solution anneals in an inert gas at about 1030° C. for about ½ hour. Each 40 to 60 percent cold reduction was typically accomplished in 2 to 4 cold rolling passes.

The wrought samples of the alloys in the various metallurgical conditions shown in Table II were prepared from sheet having a thickness of about 0.25 mm. TEM (transmission electron microscopy) disks from all alloys shown in Table II and miniature tensile samples from alloy R77 were placed in the FFTF (Fast Flux Test Facility at Hanford Washington) reactor for fast neutron ($0.1<E<1.0$ MeV) irradiation exposure at about 400°, 500° and 600° C.

TABLE II

| METALLURGICAL CONDITION | | | |
|---|---|---|---|
| S.A.* + C.W.* | S.A. | S.A. + C.W. + A* | S.A. + C.W. + $A_1$* + $A_2$* |
| X75, R76–R81 | R77 | X75, R77, R80 | R77 |

*S.A. = solution annealed at 1030° C. for ½ hour
C.W. = 20% cold rolling reduction
A = aging treatment at 650° C. for 1 hour
$A_1 + A_2$ = aging treatment at 600° C. for 1 hour followed by an aging treatment at 700° C. for 10 hours.
All heat treatments were performed in an inert atmosphere.

The preceding examples have illustrated some of the alloys according to the present invention. Other embodiments of the invention will become more apparent to those skilled in the art from a consideration of the specification or practice of the invention disclosed herein. It is intended that the specification and examples be considered as exemplary only, with the true scope and spirit of the invention being indicated by the following claims.

We claim:

1. In elevated temperature, neutron irradiation environments encountered in a LMFBR core and a fusion reactor first wall, an alloy characterized by an austenitic microstructure, and said alloy consisting essentially of:

25 to 40 wt. % Mn;
5 to 15 wt. % Cr;
about 0.4 to about 3.0 wt. % Si;
an austenitic stabilizing element selected from the group consisting of C, and N, alone or in combination with each other, and in an amount effective to stabilize said austenitic microstructure, but less than about 0.7 wt. % C, and less than about 0.3 wt. % N;
up to about 0.1 wt. % P;
up to about 0.01 wt. % B;
up to about 3.0 wt. % Al;
up to about 0.5 wt. % Ni;
up to about 2.0 wt. % W;
up to about 1.0 wt. % Ti;
up to about 1.0 wt. % Ta;
up to about 2.5 wt. % V;

with the remainder being essential iron and wherein Mo and Nb, if present, are at most incidental impurities.

2. The alloy according to claim 1 containing about 25 to about 35 wt. % Mn.

3. The alloy according to claim 2 containing about 5 to 10 wt. % Cr.

4. The alloy according to claim 3 containing less than about 0.1 wt. % N.

5. The alloy according to claim 3 containing about 0.03 to about 0.06 wt. % P and about 0.003 to about 0.006 wt. % B.

6. The alloy according to claim 2 containing less than about 0.1 wt. % N.

7. The alloy according to claim 2 containing about 0.03 to about 0.06 wt. % and about 0.003 to about 0.006 wt. % B.

8. The alloy according to claim 1 containing about 5 to about 10 wt. % Cr.

9. The alloy according to claim 8 containing less than about 0.1 wt. % N.

10. The alloy according to claim 9 containing about 0.03 to about 0.06 wt. % P and about 0.003 to about 0.006 wt. % B.

11. The alloy according to claim 8 containing about 0.03 to about 0.06 wt. % P and about 0.003 to about 0.006 wt. % B.

12. The alloy according to claim 1 containing less than about 0.1 wt. % N.

13. The alloy according to claim 1 containing about 0.03 to about 0.06 wt. % P and about 0.003 to about 0.006 wt. % B.

14. The alloy according to claim 1 containing a metal carbide forming agent in an amount of at least about 0.2 wt. % selected from the group consisting of W, Ta and Ti, alone or in combination with each other.

15. In elevated temperature, neutron irradiation environments encountered in a LMFBR core and a fusion reactor first wall, a wrought article of manufacture characterized by a cold worked austenitic microstructure, and said article of manufacture composed of an alloy consisting essentially of:

about 25 to about 40 wt. % Mn;
about 2 to about 15 wt. % Cr;
an austenite stabilizing element selected from the group consisting of C and N, alone or in combination with each other, and in an amount effective to stabilize the austenite phase, but less than about 0.7 wt. % C, and at less than about 0.3 wt. % N;
silicon in an amount effective to enhance the neutron irradiation swelling resistance of the alloy;
up to about 0.5 wt. % nickel;

and the remainder essentially iron.

16. The wrought article of manufacture according to claim 15 wherein said alloy further consists essentially of:

a strengthening agent selected from the group consisting of about 0.01 to about 0.1 wt. % P, about 0.2 to about 2.0 wt. % W, about 0.1 to about 1.0 wt. % Ti, about 0.1 to about 1.0 wt. % Ta, alone or in combination with each other.

17. In a fusion reactor, a first wall composed of an alloy characterized by an austenitic microstructure, and consisting essentially of:

20 to 40 wt. % of Mn;
up to about 15 wt. % Cr;
about 0.4 to about 3.0 wt. % Si;
an austenitic stabilizing element selected from the group consisting of C and N, alone or in combination with each other, and in an amount effective to stabilize said austenitic microstructure, but less than about 0.7 wt. % C, and less than about 0.3 wt. % N;
about 0.2 to about 2.5 wt. % V;
about 0.01 to about 0.1 wt. % P;
about 0.003 to 0.01 wt. % B;
about 0.2 to 2.0 wt. % W;

up to about 0.5 wt. % Ni;
with the remainder being iron and incidential impurities.

18. The alloy according to claim 17, containing 25 to 40 wt. % Mn.

19. The alloy according to claim 17, containing 2 to 15 wt. % Cr.

20. The alloy according to claim 17, containing 0.5 to 1.5 wt. % W.

21. The alloy according to claim 17, containing:
25 to 35 wt. % Mn;
2 to 15 wt. % Cr;
0.03 to 0.06 wt. % P;
0.003 to 0.006 wt. % B;
0.5 to 1.5 wt. % W; and
about 0.4 to 0.8 wt. % Si.

22. In a fusion reactor, a first wall composed of an alloy characterized by an austenitic microstructure and consisting essentially of:
20 to 40 wt. % of Mn;
up to about 15 wt. % Cr;
about 0.4 to about 3.0 wt. % Si;
an austenitic stabilizing element selected from the group consisting of C and N, alone or in combination with each other, and in an amount effective to stabilize said austenitic microstructure, but less than about 0.7 wt. % C, and less than about 0.3 wt. % N;
about 0.2 to about 2.5 wt. % V;
about 0.003 to 0.01 wt. % B;
about 0.5 to about 3 wt. % Al;
about 0.2 to 2 wt. % W;
up to about 0.5 wt. % Ni;
with the balance iron and incidential impurities.

23. The alloy according to claim 22, containing 25 to 40 wt. % Mn.

24. The alloy according to claim 22, containing 2 to 15 wt. % Cr.

25. The alloy according to claim 22, containing less than about 0.1 wt. % N.

26. The alloy according to claim 22, containing about 0.5 to 2.0 wt. % Al.

27. The alloy according to claim 22, containing:
25 to 35 wt. % Mn;
5 to 10 wt. % Cr;
less than about 0.1 wt. % N;
0.003 to 0.006 wt. % B;
about 0.5 to 2.0 wt. % Al; and
about 0.4 to 0.8 wt. % Si.

28. In a fusion reactor, a first wall composed of an alloy characterized by an austenitic microstructure, and consisting essentially of:
20 to 40 wt. % of Mn;
up to about 15 wt. % Cr;
about 0.4 to about 3.0 wt. % Si;
an austenitic stabilizing element selected from the group consisting of C and N, alone or in combination with each other, and in an amount effective to stabilize said austenitic microstructure, but less than about 0.7 wt. % C, and less than about 0.3 wt. % N;
about 0.01 to about 0.1 wt. % P;
about 0.003 to 0.01 wt. % B;
about 0.5 to about 3.0 wt. % Al;
with the balance iron and incidential impurities.

29. The alloy according to claim 28, containing:
25 to 35 wt. % Mn;
5 to 10 wt. % Cr;
0.4 to 0.8 wt. % Si;
less than about 0.1 wt. % N;
about 0.03 to 0.06 wt. % P;
about 0.003 to 0.006 wt. % B; and
about 0.5 to 2.0 wt. % Al.

30. The alloy according to claim 29, further consisting essentially of about 0.2 to 0.5 wt. % Ti.

31. The alloy according to claim 29, further consisting essentially of about 0.5 to 1.5 wt. % W.

32. The alloy according to claim 29, further consisting essentially of about 0.2 to 0.5 wt. % Ta.

33. The alloy according to claim 28, further consisting essentially of about 0.1 to about 1.0 wt. % Ti.

34. The alloy according to claim 28, further consisting essentially of about 0.2 to about 2.0 wt. % W.

35. The alloy according to claim 28, further consisting essentially of about 0.1 to about 1.0 wt. % Ta.

36. The alloy according to claim 28, containing 25 to 40 wt. % Mn.

37. The alloy according to claim 28, containing about 5 to 10 wt. % Cr.

38. The alloy according to claim 28, containing less than about 0.1 wt. % N.

39. The alloy according to claim 28 containing 0.5 to 2.0 wt. % Al.

40. The alloy according to claim 28, further consisting essentially of about 0.2 to 0.5 wt. % Ti.

41. The alloy according to claim 28, further consisting essentially of about 0.5 to 1.5 wt. % W.

42. The alloy according to claim 28, further consisting essentially of about 0.2 to 0.5 wt. % Ta.

43. In a fusion reactor, a first wall characterized by a cold worked austenitic microstructure and composed of an alloy consisting essentially of:
about 20–40 wt. % Mn;
about 2–15 wt. % Cr;
about 0.4 to about 3.0 wt. % Si;
C in an amount effective to stabilize said austenitic microstructure, but less than 0.7 wt. %;
a strengthening agent selected from one or more of the group consisting of
about 0.03 to about 0.06 wt. % P,
about 0.2 to about 2.5 wt. % V,
about 0.2 to about 2.0 wt. % W,
about 0.1 to about 1.0 wt. % Ti, and
about 0.1 to about 1.0 wt. % Ta;
and the remainder consisting essentially of iron wherein, Nb, Mo, Cu, N, Ni, Ag, Bi, Tb, Ir, Eu, and Ba, if present, are present only as incidental impurities in order to minimize residual radioactivity after elevated temperature, neutron irradiation as said first wall in said fusion reactor.

44. The article according to claim 43 wherein said alloy further consists essentially of about 0.003 to about 0.006 wt. % B.

45. The article according to claim 44 wherein said alloy further consists essentially of about 0.5 to about 3.0 wt. % Al.

46. The article according to claim 43 wherein said alloy further consists essentially of about 0.5 to about 3.0 wt. % Al.

* * * * *